(12) United States Patent
Fikani

(10) Patent No.: US 11,169,613 B2
(45) Date of Patent: Nov. 9, 2021

(54) AUGMENTED REALITY TASK FLOW OPTIMIZATION SYSTEMS

(71) Applicant: Atheer, Inc., Santa Clara, CA (US)

(72) Inventor: Karim Fikani, Santa Clara, CA (US)

(73) Assignee: Atheer, Inc., Santa Clara, CA (US)

( * ) Notice: Subject to any disclaimer, the term of this patent is extended or adjusted under 35 U.S.C. 154(b) by 208 days.

(21) Appl. No.: 16/422,013

(22) Filed: May 24, 2019

(65) Prior Publication Data

US 2019/0370715 A1 Dec. 5, 2019

Related U.S. Application Data

(60) Provisional application No. 62/678,211, filed on May 30, 2018.

(51) Int. Cl.
*G06F 3/01* (2006.01)
*G06T 7/60* (2017.01)
(Continued)

(52) U.S. Cl.
CPC .......... *G06F 3/017* (2013.01); *G02B 27/017* (2013.01); *G06F 3/011* (2013.01); *G06F 3/012* (2013.01); *G06F 3/0482* (2013.01); *G06F 3/0485* (2013.01); *G06F 3/04845* (2013.01); *G06K 9/00355* (2013.01); *G06K 9/00375* (2013.01); *G06Q 10/0633* (2013.01); *G06Q 10/06316* (2013.01); *G06Q 10/063116* (2013.01); *G06T 7/60* (2013.01); *G06T 7/73* (2017.01); *G02B 2027/014* (2013.01); *G02B 2027/0138* (2013.01); *G06F 2203/04806* (2013.01); *G06K 2009/00395* (2013.01); *G06T 2207/30196* (2013.01)

(58) Field of Classification Search
CPC .......... G06Q 10/00–50/00; G06F 1/00–40/00; G06T 1/00–19/00; G08B 1/00–31/00
USPC ................................................ 705/7.11–7.42
See application file for complete search history.

(56) References Cited

U.S. PATENT DOCUMENTS 5,724,262 A * 3/1998 Ghahramani ....... G06F 11/3419
702/186
5,808,908 A * 9/1998 Ghahramani ....... G06F 11/3419
702/182
(Continued)

OTHER PUBLICATIONS

Peniche, Amaury, et al. "Combining virtual and augmented reality to improve the mechanical assembly training process in manufacturing." Proceedings of the 2012 American conference on applied mathematics. 2012. (Year: 2012).*
(Continued)

*Primary Examiner* — Alan S Miller
(74) *Attorney, Agent, or Firm* — Miller IP Law

(57) ABSTRACT

A method, system, apparatus, and/or device for adjusting a task or a task flow in an augmented reality environment. The method, system, apparatus, and/or device may include: identifying a first task in a task flow to collect data associated with a user performing the first task; collecting a first set of data associated with the user performing the first task; comparing an amount of time the user expends to perform the first task to a first threshold amount of time; and in response to the amount of time the user expends to perform the first task exceeding the first threshold amount of time displaying a notification to the user or another device.

20 Claims, 9 Drawing Sheets

(51) Int. Cl.
*G06T 7/73* (2017.01)
*G06K 9/00* (2006.01)
*G06F 3/0484* (2013.01)
*G02B 27/01* (2006.01)
*G06Q 10/06* (2012.01)
*G06F 3/0482* (2013.01)
*G06F 3/0485* (2013.01)

(56) References Cited

U.S. PATENT DOCUMENTS

| | | | | |
|---|---|---|---|---|
| 8,164,461 | B2* | 4/2012 | Bischoff | H04Q 9/00 340/573.1 |
| 8,860,760 | B2* | 10/2014 | Chen | G06T 7/73 345/633 |
| 8,903,690 | B2* | 12/2014 | Bellamy | G06F 11/3684 703/6 |
| 9,681,925 | B2* | 6/2017 | Azar | A61B 34/20 |
| 2005/0026129 | A1* | 2/2005 | Rogers | G09B 7/00 434/322 |
| 2005/0165822 | A1* | 7/2005 | Yeung | G06Q 10/10 |
| 2006/0282835 | A1* | 12/2006 | Bascom | G06Q 10/109 718/100 |
| 2008/0127205 | A1* | 5/2008 | Barros | G06Q 10/10 719/313 |
| 2012/0095585 | A1* | 4/2012 | Agarwal | G06Q 10/06 700/109 |
| 2012/0265575 | A1* | 10/2012 | Torii | G06Q 10/06311 705/7.15 |
| 2013/0111480 | A1* | 5/2013 | Cox | G06Q 10/06311 718/100 |
| 2014/0178843 | A1* | 6/2014 | Smyth | G09B 19/00 434/238 |
| 2014/0354529 | A1* | 12/2014 | Laughlin | G06F 3/011 345/156 |
| 2015/0205362 | A1* | 7/2015 | Park | G06F 3/0304 345/156 |
| 2016/0239080 | A1* | 8/2016 | Marcolina | G06F 1/163 |
| 2017/0323233 | A1* | 11/2017 | Bencke | G06N 20/20 |
| 2018/0292908 | A1* | 10/2018 | Kamoda | G06T 19/006 |

OTHER PUBLICATIONS

Petersen, Nils, Alain Pagani, and Didier Stricker. "Real-time modeling and tracking manual workflows from first-person vision." 2013 IEEE International symposium on mixed and augmented reality (ISMAR). IEEE, 2013. (Year: 2013).*

* cited by examiner

AUGMENTED REALITY TASK FLOW OPTIMIZATION SYSTEMS

CROSS-REFERENCE TO RELATED APPLICATION

This application claims the benefit of U.S. Provisional Application No. 62/678,211, filed on May 30, 2018, which are hereby incorporated by reference for all purposes.

BACKGROUND

An increasing number of workers in a variety of industries are assisted by hand-held or wearable computer systems. Rather than using computer kiosks or workstations at locations throughout the work environment, the hand-held or wearable computers allow the worker to move freely about the workspace and retrieve information from computer networks accessible at their fingertips, while they maintain in proximity to the object of the task. An augmented reality system may be used to further enhance task flows where users need information to complete a task.

BRIEF DESCRIPTION OF THE DRAWINGS

The present description will be understood more fully from the detailed description given below and from the accompanying drawings of various embodiments of the present embodiment, which is not to be taken to limit the present embodiment to the specific embodiments but are for explanation and understanding.

DETAILED DESCRIPTION

Figure 1A:
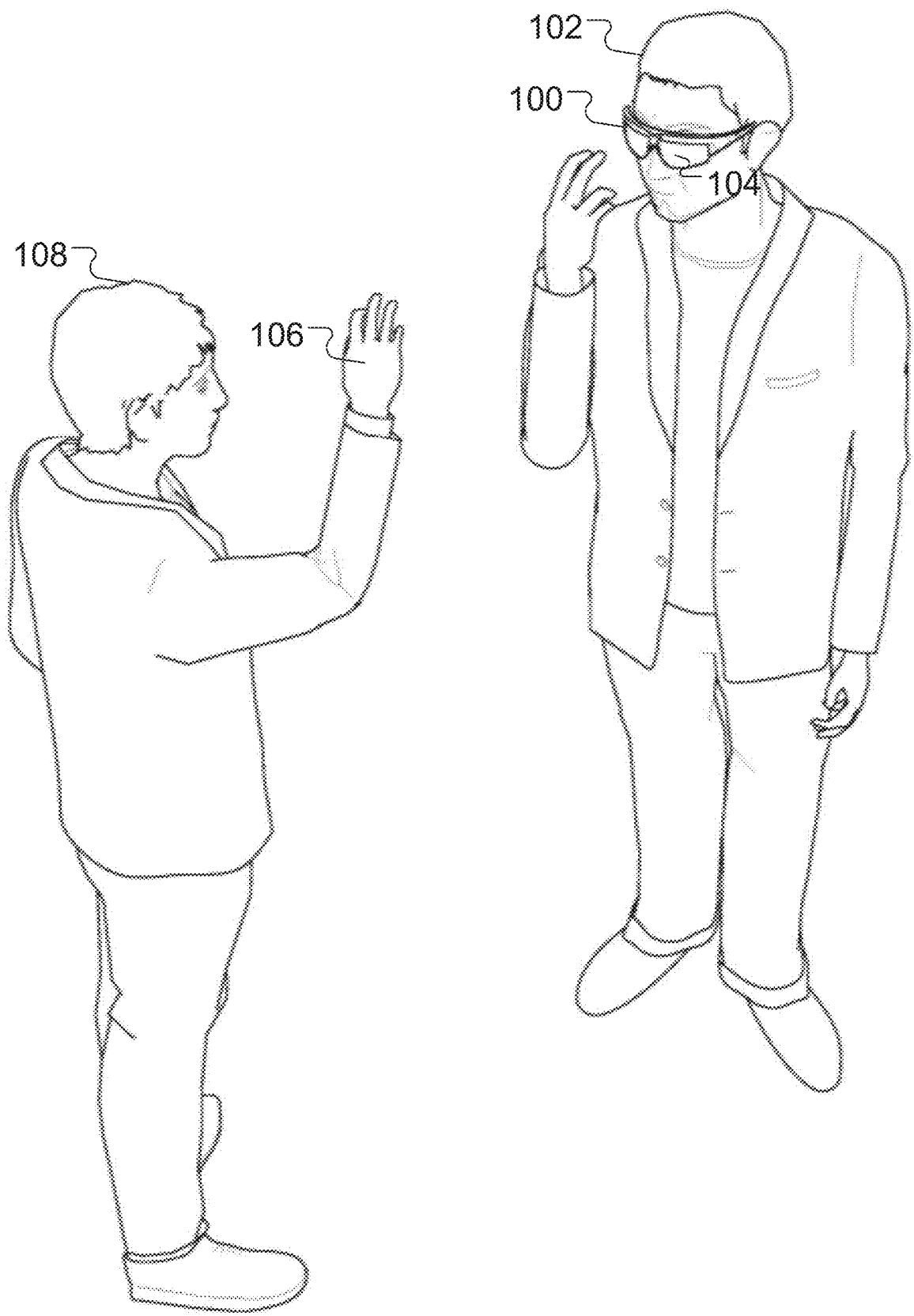
FIG. 1A illustrates a perspective view of a wearable device being worn by a user, according to an embodiment.

The disclosed augmented reality task flow optimization systems will become better understood through a review of the following detailed description in conjunction with the figures. The detailed description and figures provide merely examples of the various embodiments described herein. Those skilled in the art will understand that the disclosed examples may be varied, modified, and altered and not depart from the scope of the embodiments described herein. Many variations are contemplated for different applications and design considerations, however, for the sake of brevity, the contemplated variations may not be individually described in the following detailed description.

Throughout the following detailed description, examples of various augmented reality task flow optimization systems are provided. Related features in the examples may be identical, similar, or dissimilar in different examples. For the sake of brevity, related features will not be redundantly explained in multiple examples. Instead, the use of related feature names will cue the reader that the feature with a related feature name may be similar to the related feature in an example explained previously. Features specific to a given example will be described in that particular example. The reader is to understand that a given feature need not be the same or similar to the specific portrayal of a related feature in any given figure or example.

Individuals that work in industries where their hands must remain free to perform tasks may use wearable computer systems to retrieve and/or view information needed to perform the tasks. For example, individuals working in manufacturing facilities may be required to maintain a clean and hygienic manufacturing area to prevent cross-contamination. Additionally, in the manufacturing environment and other environments, it may be required to record that all the steps and instructions in a defined manufacture procedure were performed. Wearable computer systems may aid in recording all the steps and instructions performed and in investigating or documenting deviations taken during the manufacturing procedure. The records of the manufacturing and distribution of items with a complete manufacturing history may enable a manufacturer to retain the manufacturing information in a comprehensible and accessible format in case an investigation is needed to determine a product defect or failure. In another example, in retail operation environments, sales assistants or inventory control clerks may use wearable computer systems to identify products and/or retrieve product information associated with a product. The wearable computer system may provide guidance and aid individuals in performing tasks. However, different users may perform different tasks or the different users may perform the same task differently. Providing the same guidance and aid to the different users may be ineffective for the individuals who perform the task differently from the default guidelines. Additionally, providing the same guidance and aid to the different users may not aid the individuals in learning how to correctly perform tasks.

Implementations of the disclosure address the above-mentioned deficiencies and other deficiencies by providing methods, systems, devices, or apparatus to display an augmented reality environment to users and provide interactive user interfaces. The methods, systems, devices, or apparatus may also improve a task flow of tasks displayed in an augmented reality system.

In one embodiment, the augmented reality systems may be head-mounted systems. In another embodiment, the augmented reality systems may include sensors and/or detector units to detect, gather, and/or transmit data to a processing device. The processing device may be an integrated or onboard processing device or an external or remote processing device. In another embodiment, the augmented reality systems may include an augmented reality display to display or overlay information to a user. In another embodiment, the augmented reality systems may include providing a user access to remote help, capture images and/or sensor data to send to a remote individual, and so forth. For example, an augmented reality system may transmit a still image or a video from a perspective of the user, also referred to as a "see what I see" perspective.

In another embodiment, the augmented reality systems may overlay images from another user's device into an augmented reality environment display for a viewer to see a projected perspective of the images from the other user's device, such as a re-creation of what is being viewed by the other user. One advantage of the augmented reality systems may be to enhance task flows of users when the users need information displayed to them to perform a task. Another advantage of the augmented reality systems may be to provide a user interface for the users to interact within a variety of environments, include hands-free environments, clean and hygienic environments, collaborative environments, remote environments, and so forth.

FIG. 1A illustrates a perspective view of a wearable device 100 being worn by a user 102, according to an embodiment. The wearable device 100 is designed to display an image near an eye or eyes of a user 102 and execute computer-executable instructions in response user gestures by incorporating motion and image capture features. The wearable device 100 may include lens 104 substantially near the eye(s) of the user 102. The lens 104 may include a transparent or partially transparent screen that is at least partially disposed within a field of view of the user 102. The screen may display an augmented reality where a user may be able to view augmented reality objects. The screen may have a transparency level to enable the user 102 to see gestures 106 and real-world objects 108.

Figure 1B:
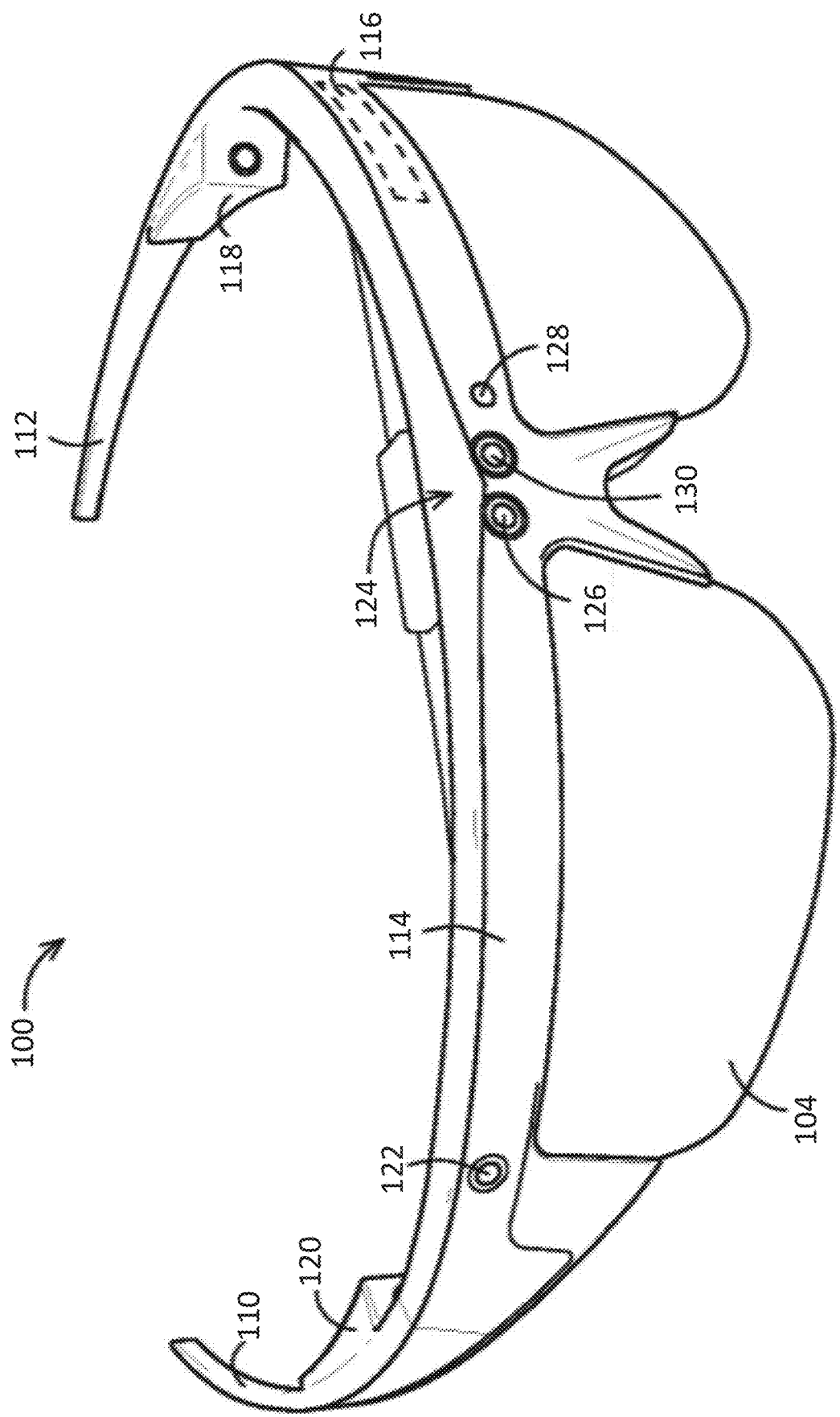
FIG. 1B illustrates a perspective view of the wearable device in FIG. 1A, according to an embodiment.

FIG. 1B illustrates a perspective view of the wearable device 100 in FIG. 1A, according to an embodiment. Some of the features in FIG. 1B are the same or similar to some of the features in FIG. 1A as noted by same reference numbers, unless expressly described otherwise.

The wearable device 100 may include a first temple 110, a second temple 112, and a bar 114 extending between the two temples 110 and 112. The first temple 110 and second temple 112 extend from the wearable device 100 to rest on the ears of the user 102 in FIG. 1A to provide support for the wearable device 100.

The wearable device 100 may include a processing device 116, the lens 104, a first image generator 118, a second image generator 120, a motion capture device 124, and a microphone 122. The wearable device 100 may be configured to capture user gestures, along with other objects within a captured scene, and execute computer processes or commands in response to the captured objects. This may involve manipulating a display produced by a first image generator 118 and/or a second image generator 120 on lens 104. For example, the first image generator 118 may display a first virtual object or portion of a virtual object on a first portion of the lens 104. In another example, the second image generator 120 may display a second virtual object or portion of a virtual object on a second portion of the lens 104. In another example, the lens 104 may be a single continuous lens extending across the bar 114. In another example, the lens 104 may include multiple lens or portions of lens extending across the bar 114. The first virtual object and/or the second virtual object includes text, a graphical object, a video, a live data steam, and so forth.

The wearable device 100 may additionally execute computer processes in response to audio captured by the microphone 122. By incorporating these capturing technologies, the wearable device 100 may display and control computer images and processes. The processing device 116 may be supported by the bar 114. The processing device 116 may be configured to execute computer-executable instructions and control the electronic elements of the wearable device 100.

The processing device 116 may acquire data from other elements of the wearable device 100 or from external sources and execute computer executable code in response to this data. For example, the processing device 116 may be configured to acquire data from the motion capture device 124 such as data that corresponds to a user gesture. The processing device 116 may additionally or alternatively acquire data from the microphone 122. In some examples, the processing device 116 may acquire data from a separate device, such as a portable music player, a personal data assistant (PDA), a smartphone, a global positioning system (GPS), or the like.

The processing device 116 may be in coupled to the first image generator 118 and/or the second image generator 120 and may instruct the first image generator 118 and/or the second image generator 120 to generate and manipulate a display projected on lens 104. In one example, the processing device 116 may generate a user interface on the lens 104. The processing device 116 may acquire data from other elements or sensors of the wearable device 100 and manipulate the user interface in response to this data.

The first image generator 118 and/or the second image generator 120 may be attached to the first temple 110 and may be substantially aligned with the lens 104. The wearable device 100 may include additional image generators to augment the expanse of generated images over the lens 104 surface area. The first image generator 118 and/or the second image generator 120 may be configured to display images on the lens 104 facing an eye or eyes of the user 102 in FIG. 1A in response to instructions executed by the processing device 116. These images often may overlay and/or augment a naturally viewed scene within a field of vision of the user 102. The first image generator 118 and/or the second image generator 120 may display opaque and/or partially transparent images on the lens 104.

The motion capture device 124 may be connected to the bar 114. In one embodiment, the motion capture device 124 may be oriented away from the user 102 when the user 102 is wearing the wearable device 100 to capture images and motion occurring beyond the lens 104. In another embodiment, the motion capture device 124 may include an image sensor 126 with a camera, a light source 128, and a depth sensor 130. The motion capture device 124 may capture images that include at least a portion of the environment surrounding the wearable device 100 (such as a head-mounted device or a head-mounted display).

The image sensor 126 may be connected to the bar 114. In one embodiment, the image sensor 126 may be oriented away from the user 102 as the user 102 wears the wearable device 100. The image sensor 126 may be configured to capture an image from a scene and communicate data corresponding to the captured image to the processing device 116. The image sensor 126 may capture light within the visual spectrum and/or light outside the visual spectrum. For example, the image sensor 126 may capture infrared or ultraviolet light.

The light source 128 may be connected to the bar 114. The light source 128 may be substantially aligned with the image sensor 126. The light source 128 may be configured to project light in a defined direction. This light is reflected from an object and may be captured by the motion capture device 124. The reflected light may allow the motion capture device 124 to more accurately capture images and motion of objects or the surrounding environment. The light source 128 may project visual light and/or light outside the visual spectrum.

The depth sensor 130 may be connected to the bar 114. The depth sensor 130 may be configured to capture images and motion from a scene at a different angle than image sensor 126. The data captured from this second viewpoint may allow the processing device 116 to compare the data received from the depth sensor 130 to the data received from the image sensor 126 to better detect a depth of objects in the environment surrounding the wearable device 100.

Figure 2:
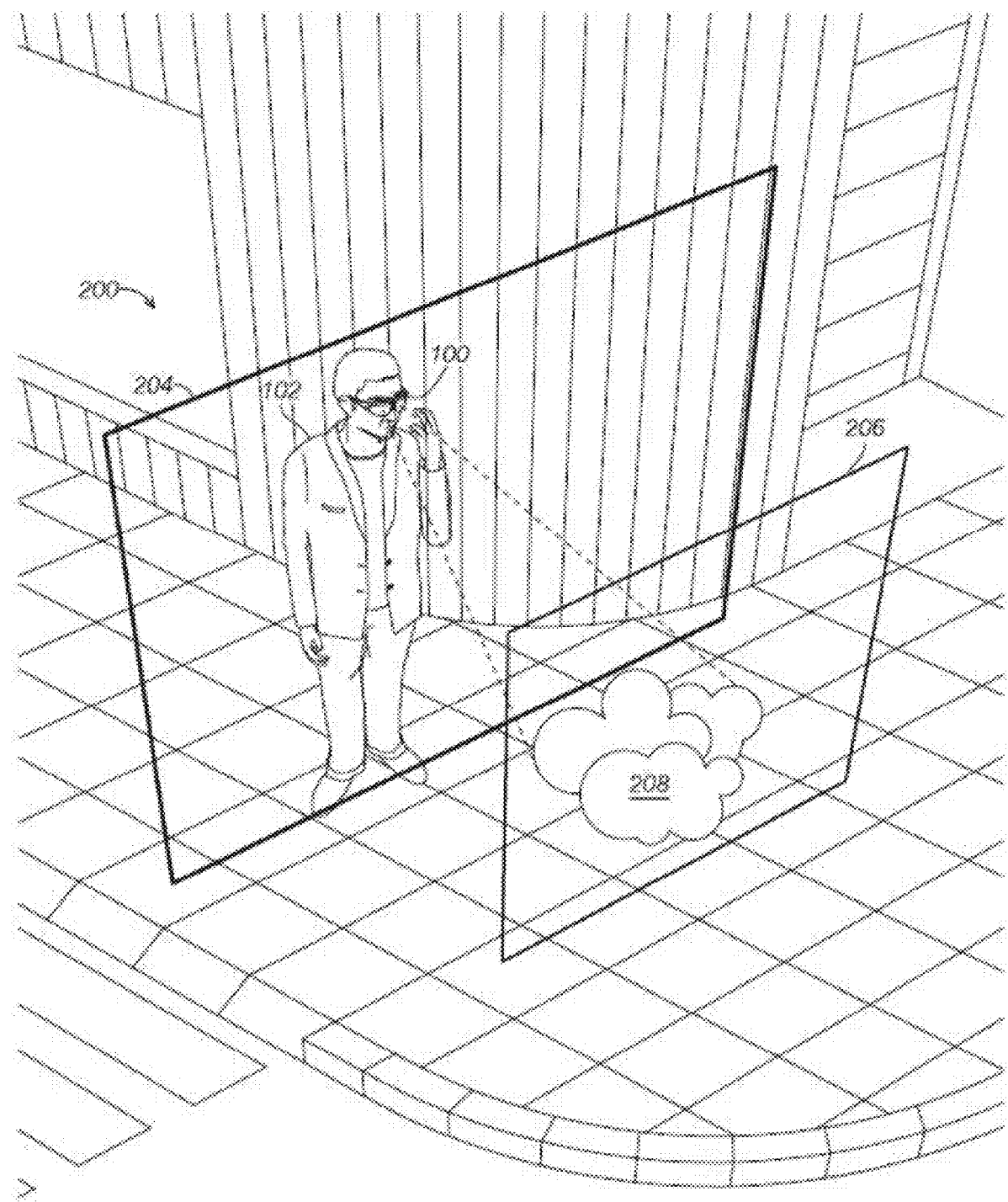
FIG. 2 illustrates an augmented reality system with a user wearing the wearable device, according to an embodiment.

FIG. 2 illustrates an augmented reality system 200 with a user 102 wearing the wearable device 100, according to an embodiment. Some of the features in FIG. 2 are the same or similar to some of the features in FIGS. 1A and 1B as noted by same reference numbers, unless expressly described otherwise. The user may be located along a first plane 204. The wearable device 100 may include a lens 104 to display a virtual object to an eye or eyes of the user 102. For example, the wearable device 100 may include a first portion of the lens 104 that may display a first image or virtual object to a first eye of the user 102 and a second portion of the lens 104 that may display a second image or virtual object to a second eye of the user 102. When combined or aggregated, the first image or virtual object and the second image or virtual object may form an augmented reality environment to project one or more virtual or augmented reality objects to the user 102 at defined locations within a physical environment surrounding the user 102.

The wearable device 100 may display multiple images to project one or more virtual or augmented reality objects 208 within a physical environment surrounding the user 102. In one embodiment, the user and the wearable device 100 may be located along the first plane 204 and the augmented reality object 208 may be displayed to appear at a defined distance from the user 102 at a second plane 206. In one embodiment, the wearable device 100 may include a position sensor, such as a GPS device or a position transceiver. For example, the wearable device 100 may be a pair of glasses, smart glasses, a face shield, and so forth that may be worn by the user 102 and include multiple sensors, including the position sensor. In another embodiment, the position sensor may separate from the wearable device 100 and be attached to the body of the user 102.

In one example, the position sensor may be positioned proximate to a line of sight of the user 102. In another embodiment, an alignment sensor may measure a difference between a position of the user 102 indicated by the position sensor and the actual location of the user's eyes and generates a view aligned to the user's line of sight. In one embodiment, the lens 104 in FIGS. 1A and 1B may project a virtual or augmented reality environment or a virtual or augmented reality object 208 at a set focal distance from the user 102. In one example, the focal distance may be along the second plane 206. The virtual or augmented reality environment or the virtual or augmented reality object 208 may be a user interface that enhances or supplements the user's interactions in the physical environment and/or physical objects approximate or surrounding the user.

Figure 3:
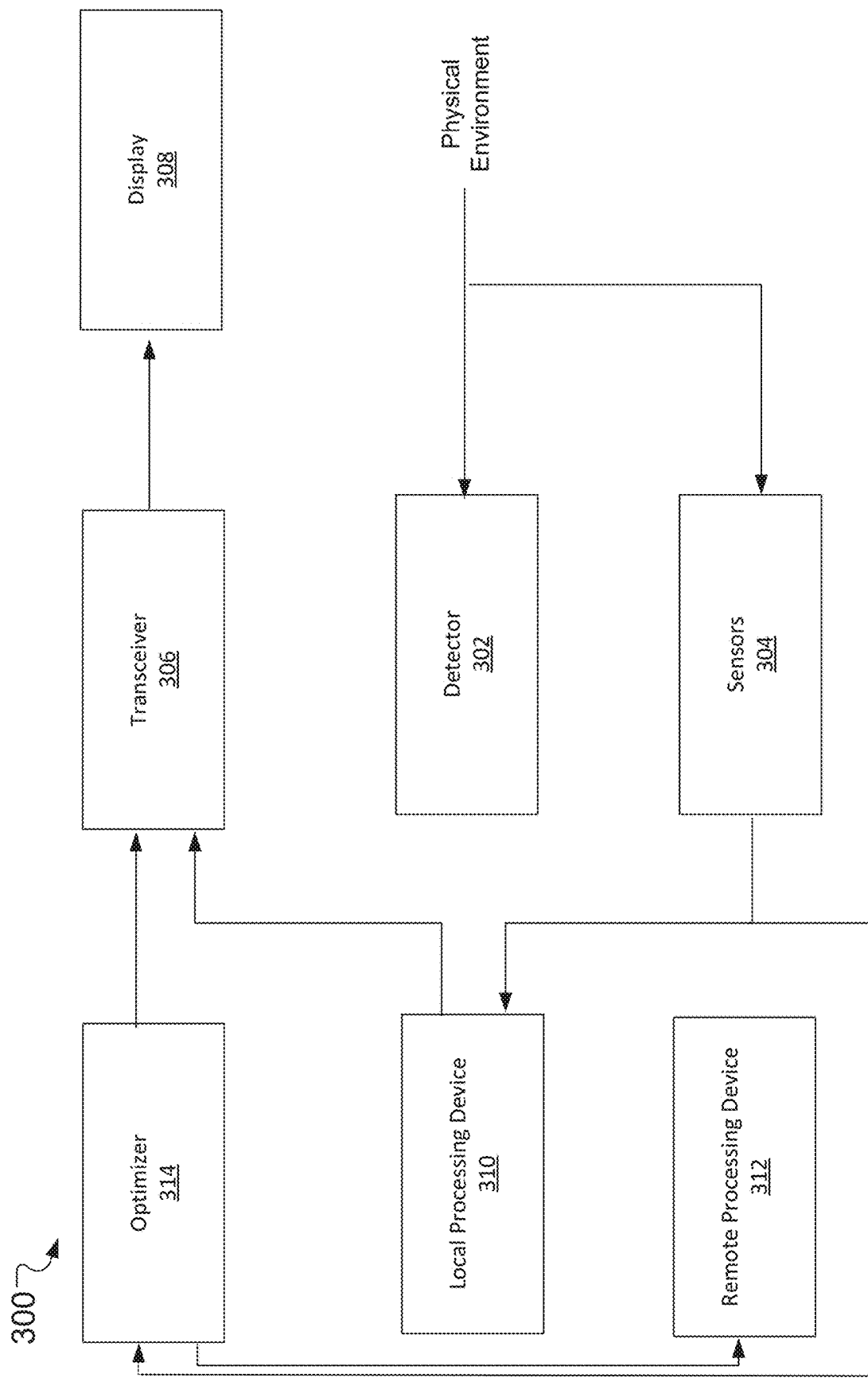
FIG. 3 illustrates a system of the wearable device in FIGS. 1A-2, according to an embodiment.

FIG. 3 illustrates a system 300 of the wearable device 100 in FIGS. 1A-2, according to an embodiment. The system 300 may include a detector 302, sensors 304, a transceiver 306, an augmented reality display 308, a local processing device 310, a remote processing device 312, and an optimizer 314. In one embodiment, the detector 302 and/or the sensors 304 may take measurements and collect data from a physical environment approximate to the wearable device 100. In another embodiment, the local processing device 310 may be a local processing device attached to or integrated into the wearable device 100.

The local processing device 310 may be positioned proximate to the user that interacts with a remote processing device 312. In another embodiment, the remote processing device 312 may be a remote processing device that may be external to the wearable device 100. The transceiver 306 may receive instructions from the local processing device 310 to project the augmented display 20. The transceiver 306 may measure characteristics from the physical environment and communicate the data to the local processing device 310 and an optimizer 314.

The optimizer 314 may be in communication with the remote processing device 312, the local processing device 310, and the transceiver 306. The transceiver 306 may measure or detect user characteristics or gestures including head position, movement, speed, etc. In one example, using gestures, the user may open applications to be displayed in the augmented environment. These applications may include task flows, attached documents, and so forth. The gestures may allow the user to access the applications and execute instructions such as select instructions, open instructions, scrolling instructions, movement instructions, and so forth. Alternatively, the gestures may be used to operate on the icon representing the application by changing the size (zooming in and out), color, sound, and so forth. The gestures may include the user performing scrolling gestures, tapping gestures, or clicking gestures with respect to a virtual object. The scrolling gestures may include body motions, head motions, hand motions, and so forth.

Figure 4:
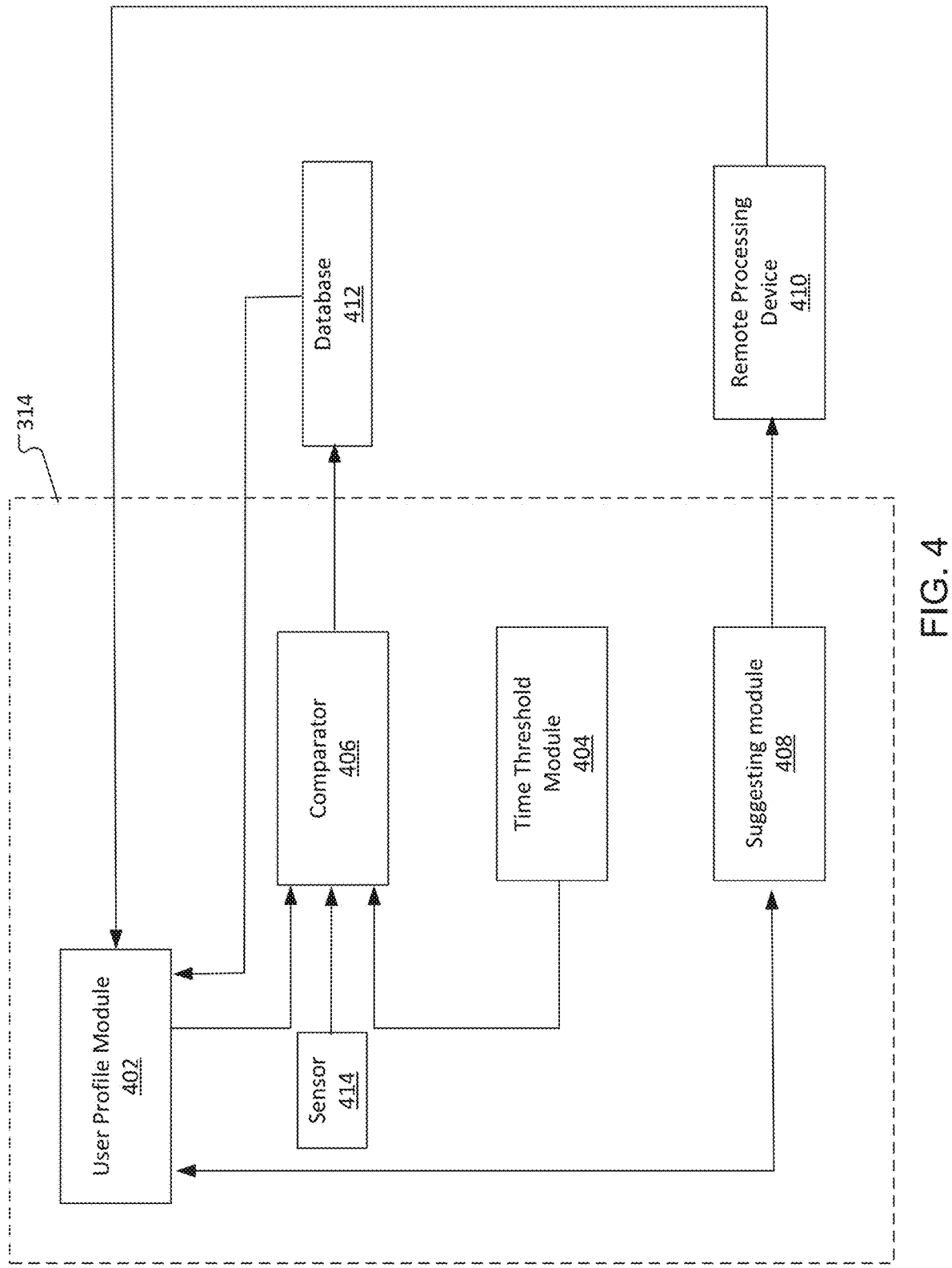
FIG. 4 illustrates a functional block diagram for the optimizer shown in FIG. 3, according to an embodiment.

FIG. 4 illustrates a functional block diagram for the optimizer 314 shown in FIG. 3, according to an embodiment. In one example, the database 412 may include unique user profiles, industry standards, and so forth. The optimizer 314 may include a memory device to store user profile module 402. In one example, the user profile information may include information about a user's age, job or responsibilities, experience level, gender, length of employment, previous tasks performed, and so forth. The optimizer 314 may include a time threshold indicator 404 with a database to store information indicating a threshold amount of time an individual should take to complete a given task when the task is performed efficiently and correctly. For example, when the user is working on changing the oil of an airplane, the database of the time threshold indicator 404 may include defined amounts of time for the tasks of removing an oil plug, draining the oil, removing the oil filter, inserting a new oil filter, replacing the plug, and filling the oil pan with oil. In one embodiment, the threshold amounts of time may be set by an expert or an individual experienced in performing the tasks. In another embodiment, the threshold amounts of time may be determined by averaging an amount of time taken by a set of users each performing the tasks, such as during a training period for the optimizer 314. The threshold amounts of time may be updated or changed over time as the average changes or, as discussed below, based on user profile information.

The optimizer 314 may include a comparator 406 that is configured to receive the user profile information from the user profile module 402, the threshold amounts of time for the individual to perform the tasks from the time threshold indicator 404, and the actual amounts of time taken by the user to perform the tasks as measured by a sensor 414 of the optimizer 314. The sensors 414 may be the sensors of the wearable device 100 as in FIGS. 1A-3. The comparator 406 may determine whether the actual amount of time taken by the user to perform the tasks is within the threshold amounts of time.

In one embodiment, the threshold amounts of time may be fixed, where the threshold amounts of time are the same for any individual performing the tasks. For example, the threshold amount of time for removing the oil plug may be 3 minutes for any individual performing the task and the comparator 406 may determine whether the individual performed the task within the 3 minutes of allotted time. In another example, the comparator 406 may determine if the individual exceeds the 3-minute threshold amount of time and if so by how much. In another example, the comparator 406 may determine if the individual performed the task in less then the 3 minutes of allotted time.

In one example, the threshold amounts of time may be adjusted based on the user profile. For example, when the user profile indicates that the individual is relatively inexperienced for performing the task, the comparator 406 may use a first threshold amount of time instead of a second threshold amount of time associated with an individual that is relatively experienced or has a user profile with an experience level that exceeds a threshold level. In another embodiment, the comparator 406 may increase or decrease the threshold amount of time-based on characteristics of the user indicated in the user profile, such as experience level, age, gender, and so forth. For example, when the individual is an inexperienced elderly individual the comparator 406 may increase the threshold amount of time whereas when the individual is an experienced youthful individual the comparator 406 may decrease the threshold amount of time.

In another embodiment, the sensor 414 or another sensor may take environmental measurements, such as light conditions measurements, weather conditions measurements, temperature conditions measurements, time of day indicators, noise levels measurements, and so forth. The comparator 406 may adjust the threshold amount of time-based on the environmental measurements. For example, when environmental measurements indicate that the light level is low, the noise level is high, or the weather is raining or snowing, the comparator 406 may increase the threshold amount of time for the individual to complete the task. In another example, when environmental measurements indicate that the light level is normal, the noise level is low, or the weather is sunny, the comparator 406 may decrease the threshold amount of time for the individual to complete the task.

In another example, the comparator 406 may store the information regarding whether the individual performed the tasks within the threshold amount of time and/or the difference between the time the individual performed the tasks and the threshold amount of time at the database 412. In one example, the user profile module 402 may be coupled to the database 412. The user profile module 402 may access the database 412 to retrieve the information indicating the amount of time the individual took for a task or a set of tasks in comparison to the threshold amounts of time for the task(s), and the user profile module 402 may update the user profile for that individual to reflect that information.

The optimizer 314 may include a suggesting module 408 that is coupled to the user profile module 402. In one example, the suggesting module 408 may access the user profile information stored at the user profile module 402. A module may be an application or software executing on a processing device. In another example, the suggesting module 408 may access the user profile information at the database 412 via the user profile module 402. In another example, the suggesting module 408 may access the database 412 directly. In one embodiment, when the user profile information indicates that the time the user is taking to complete a task exceeds the threshold amount of time, the suggesting module 408 may provide a hint or recommendation on how to complete the task.

In another embodiment, when the user profile information indicates that the time the user is taking to complete a task exceeds the threshold amount of time, the suggesting module 408 may provide the user with a tutorial video or image to aid the user in completing the task. In another embodiment, when the user profile information indicates that the time the user is taking to complete a task exceeds the threshold amount of time, the suggesting module 408 may identify an expert or an individual experienced in performing the task in a database of the suggesting module 408 or connected to the suggesting module 408. The suggesting module 408 may then establish a communication link between the wearable device 100 and a device associated with the expert or the experienced individual so that the expert or experienced individual may provide the user with aid and/or recommendation in completing the task. For example, the communications link may be a video chat, an audio chat, a phone call, a text message, an email, and so forth.

In one embodiment, the suggesting module 408 or the wearable device 100 may record the communication between the user and the expert in the database 412, another database, or a memory storage device. The stored communications may include instant messages, e-mails, phone calls, files, video chats, transcripts, and so forth between the users of the user devices.

In one example, when the amount of time the user or another user takes to perform the same task exceeds the threshold amount of time for the task, the suggesting module 408 may playback, to the user or the other user, the recorded communication between the user and the expert. In another example, the suggesting module 408 may update a task flow for the user to perform the task based on the communications between the user and the expert and/or other aids or recommendations received by the user. In another example, the suggesting module 408 may monitor how the user adjust or changes how he/she performs the task based on the suggestions or recommendations and revised the task flow in view of the adjustments or changes.

As further discussed below, the suggesting module 408 may send notifications to a system administrator or the expert that manages the threshold amounts of time. The notifications may include recommendations or suggestions to increase or decrease the threshold amounts of time for different tasks based on the amount of time taken by the user or multiple users to perform a task. For example, if the average time a set of users take to perform a task exceeds the threshold amount of time, the suggesting module 408 may send a suggestion of the system administrator or the expert to increase the threshold amount of time.

In one embodiment, the suggesting module 408 may be connected to a remote processing device 410. The suggesting module 408 may send a record of the notifications, sensor data, and/or other information collected and/or recorded by the optimizer 314 to the remote processing device 410. In one embodiment, the remote processing device 410 may associated with a task flow owner so that the task flow owner may review the notifications, the sensor data, or the other information to improve the task flow. In another embodiment, the remote processing device 410 may be coupled to the use profile module 402 and the remote processing device 410 relay the notifications, the sensor data, or the other information to the user profile module 402. The user profile module 402 may then update the user profile associated with the user based on the notifications, the sensor data, or the other information. In another embodiment, the suggesting module 408 may be coupled to the user profile module 402 and may send the notifications, the sensor data, or the other information directly to the user profile module 402.

Figure 5:
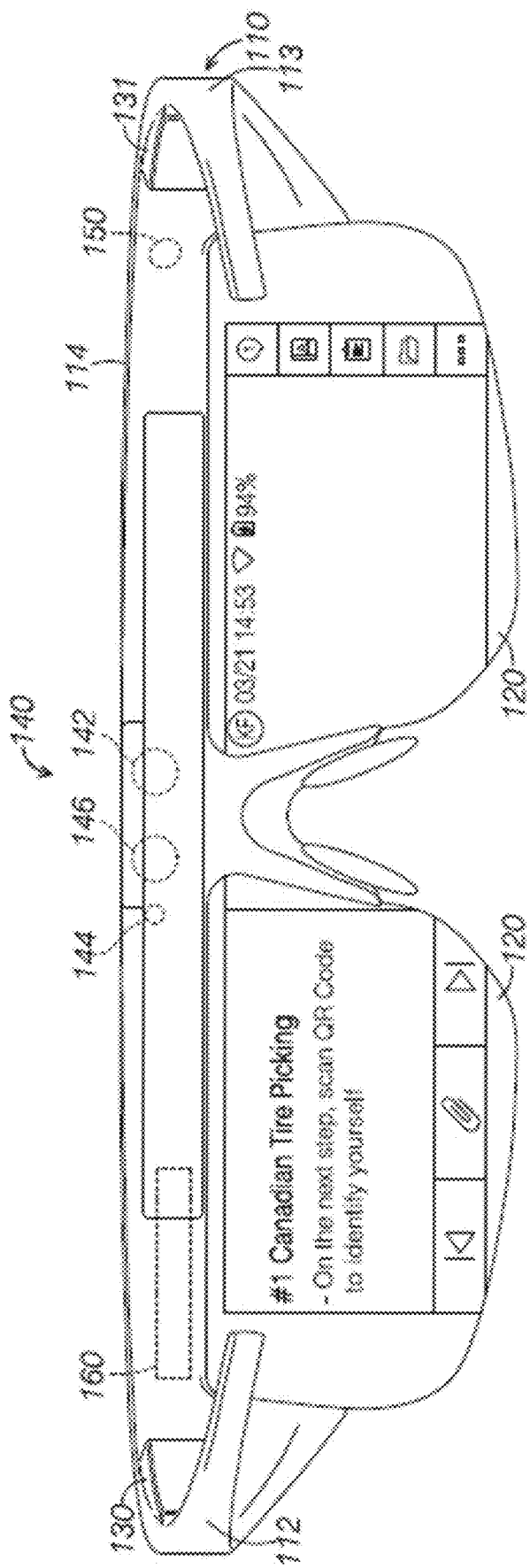
FIG. 5 illustrates the wearable device in FIGS. 1A-4 displaying a message associated with a task of a task flow for a project, according to an embodiment.

FIG. 5 illustrates the wearable device 100 in FIGS. 1A-4 displaying a message associated with a task of a task flow for a project, according to an embodiment. Some of the features in FIG. 5 are the same or similar to some of the features in FIG. 1A-1B as noted by same reference numbers, unless expressly described otherwise. As discussed above, the optimizer 314 in FIGS. 3 and 4 may collect and analyze a task(s) of a task flow for an individual performing one or more tasks and provide recommendations to improve the task and/or task flow. For example, the method may provide steps for optimizing a task flow of the user in the augmented reality environment. The task flow may be a task-by-task process showing how a user may interact with a system in order to complete a project. As discussed below, a task flow may include a diagram or map of one or more sequences of tasks for the user to complete the project and decision points for the user to follow different sets of tasks for the user to follow to complete the project based on the activities and decisions of the user.

The tasks and decision points may represent activities performed by the user and/or a system in completing the project. The wearable device 100 may display a notification or message 504 to a user to instruct the user regarding the next task in the task flow and/or display notifications to aid the user in completing the task within a threshold amount of time. For example, when the user is struggling to complete a task and has expended an amount of time that exceeds a threshold amount of time, the display may display the notification 504 to provide the user with a suggestion on how to complete a task for object 502. The notification 504 may include text, graphical objects, videos, video chats, live data streams, and so forth. The notification 504 may aid the user to complete the task and/or provide feedback to the user after the user completes the task.

Figure 6A:
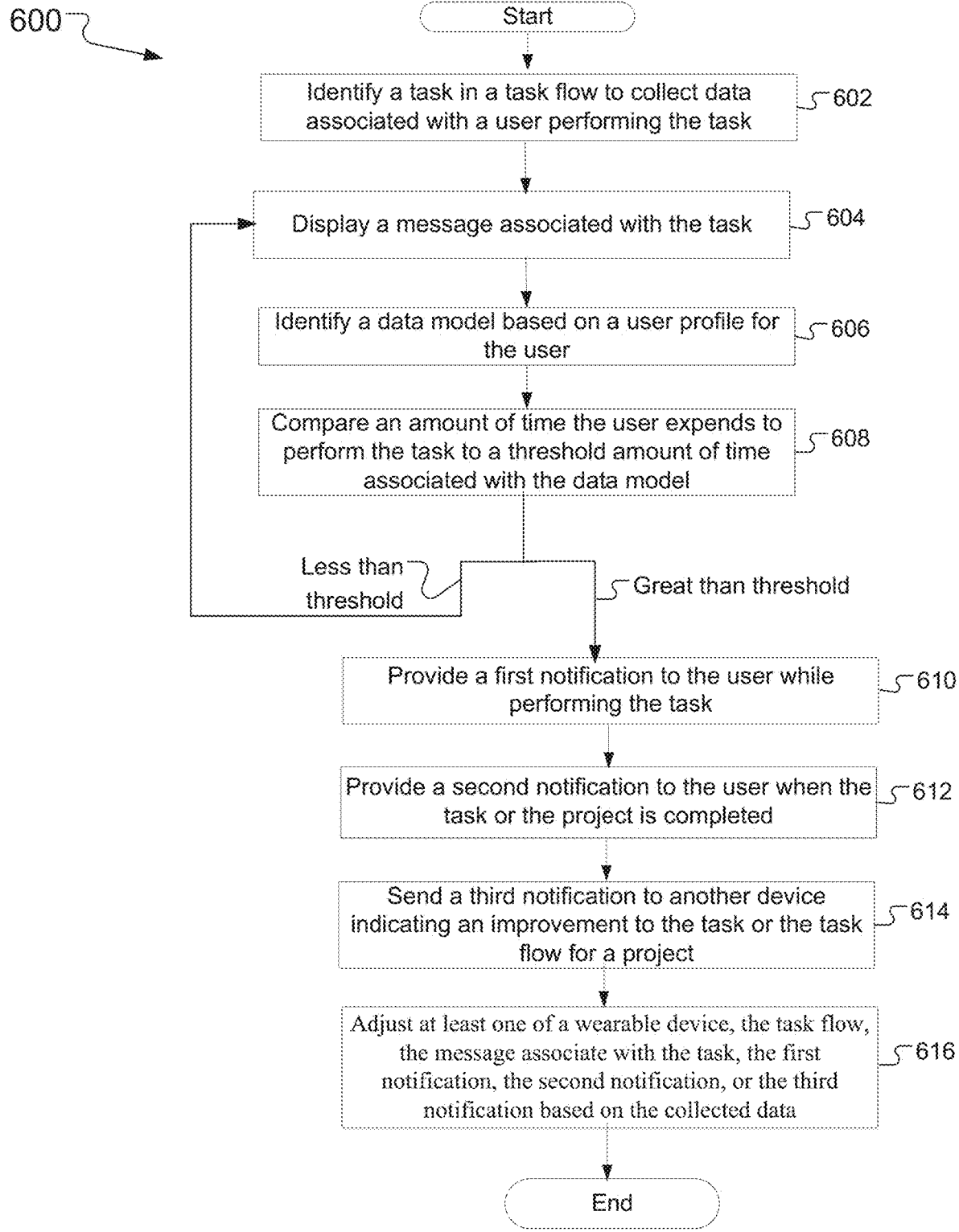
FIG. 6A illustrates a flowchart of a method for revising a task flow for a set of tasks, according to an embodiment.

FIG. 6A illustrates a flowchart 600 of a method for revising a task flow for a set of tasks, according to an embodiment. In one embodiment, the method in the flowchart 600 may be performed by the optimizer 314 in FIGS. 3 and 4 executing on a processing device. The method may include identifying a task in a task flow to collect data associated with a user performing the task (block 602).

In one embodiment, to identify the task to collect data for, a processing device may identify the task based on one or more parameters or criteria. In one example, the parameters may include an experience level or skill level of the user, industry-specific restrictions, and so forth. For example, when the individual is a trainee with an insufficient amount of skills or experience to perform the task, the processing device may determine not to collect data associated with the user performing the task. In another example, when the individual is relatively experienced, the processing device may identify the task to collect data on. In another example, when the task includes information associated with privacy rules, such as patient privacy, user privacy, or trade secrets, the processing device may not collect data associated with the task or may only collect data for certain tasks.

In another embodiment, the collected data may include performance information, speed measurements, a number of movements by the individual, a size of motion or movements by the individual (measured by distance or angle measurements), environment information, and so forth. In another embodiment, the type of data collected for the task may be adjusted based on the individual performing the task. For example, the wearable device 100 in FIGS. 1A-5 may include one or more sensors (such as an optical camera or infrared scanner) to measure the physical features of an individual, such as a height of the individual, visual capabilities of the individual, body type of the individual, gender of the individual, and so forth. When the wearable device 100 measures the physical features, the processing device may select an initial user profile based on the physical feature of the individual. In another example, based on the physical features of the user, the processing device may suggest physical aids for the user to utilize via a display, such as using stepstool or repositioning the machinery. In another embodiment, the task may be identified by a system administrator or user for optimization of the task or for further review by the system administrator. In another embodiment, the system administrator or user may identify tasks that were previously optimized or reviewed that do not need further review or optimization. In another embodiment, the selected tasks may be chosen by a system administrator or user based on a priority of the task being performed by the user.

The method may include displaying a message associated with the task (block 604). For example, the task flow may be a task-by-task process of activities a user is to perform to complete a project. In one example, a task flow may include a diagram or map of the one or more sequences of tasks for the user to complete the project and decision points for the user to follow different sets of tasks for the user to follow to complete the project based on the activities and decisions of the user. The tasks and decision points may represent activities performed by the user and/or a system in completing the project. In one embodiment, the wearable device 100 of FIGS. 1A-5 may include a display with a user interface to indicate one or more of the tasks the user is to perform and/or activities associated with the one or more tasks to complete the tasks in the task flow for the project.

The method may include identify a data model based on a user profile of the user (block 606). The data model may be a model of an execution time of the task by an expert or an average of all task performers. In one embodiment, an initial data model may be defined by an expert in performing the task. In one example, when the initial data model is defined, the processing device may update the model based on users performing the task. The processing device may adjust the data model based on an average of time taken for users to perform the task. The data model may be iteratively updated as the number of users that perform the task increases and/or the number of times the users performs the task increases.

The method may include comparing an amount of time the user expends to perform the task to a threshold amount of time associated with the data model (block 608). For example, an expert may define an optimal amount of time for a task as being 5 min to execute. In one embodiment, when the user finishes the task in two minutes, the processing device may tag the data as indicating a user completed the task in less than the threshold amount of time. In another embodiment, when a threshold number of users complete the task in an amount of time less than the threshold amount of time, the processing device may decrease the threshold amount of time, such as to an average of the amount of time taken by the users. For example, when a first user completes the task in 2 minutes and a second user completes the task in 3 minutes, the processing device may set the threshold amount of time as 2.5 minutes. In another example, the processing device may select the highest amount of time taken by a user that is less than 5 minutes and may set the threshold amount of time as that amount of time.

In another embodiment, when the amount of time taken by the user is approaching the first threshold amount of time (i.e. within a second threshold amount of time) the processing device may provide a notification to the user suggesting the user contact an expert. When the first amount of time is reached, the processing device may require the user to contact the expert or provide a second recommendation to contact the expert. For example, for a first threshold amount of time of 5 minutes, when the user has taken 4 minutes to work on the task, the processing device may suggest the user contact the expert. If the user ignores the 4-minute recommendation and the user reaches the 5-minute threshold, the processing device may provide a second recommendation or may require the user contact the expert. The expert may be an individual have experienced with the task or the overall project. For example, the individual that originally generated the task or the task flow for the project may be defined as an expert for the task.

When the user completing the task within the threshold amount of time, the processing device may identify another task of the task flow to monitor. For example, the processing device may iteratively monitor different tasks in the task flow to increase the user's efficiency and decrease the amount of time the user expends when performing the different tasks in the task flow.

The method may include, when the user does not complete task within the threshold amount of time, providing a first notification to the user while the user is performing the task (block 610). For example, when the amount of time the user takes to complete the task exceeds the threshold amount of time, the processing device via a display may display a notification providing a suggestion for how the user may reduce the time taken to complete the task or how to otherwise improve the user's efficiency in performing the task. As discussed above, the threshold amounts of time may be based on a profile of the user and/or environmental factors in the area where the user is performing the task. For example, when the user is performing the task on an oil rig and the ambient temperature increase beyond a threshold degree level, the processing device may increase the amount of time the user may take to perform the task. In another example, the environmental factors may include light parameters, such as a hue level, an intensity level, an illumination level, and so forth.

The method may include providing a second notification to the user when the task or the project is completed (block 612). In one embodiment, when the processing device via a display displayed a notification to the user as the user performed the task, the processing device via the display may display a second notification when the task or the project is complete, where the second notification requests feedback from the user as to whether the first notification was helpful to the user in completing the task. For example, to determine that the first notification was helpful to the user, the processing device via the display may determine when the user proceeds to the next step of the project and display a notification requesting input as to whether the first notification was helpful. The user may then use an input device (such as a gesture detection device for an augmented reality environment) to input whether the first notification was helpful. In one embodiment, the user response to the second notification may be sent to a device associated with the system administrator or another device for the system administrator to use in adjusting the task flow for a project. In another embodiment, the processing device may automatically update the task flow for the project, the task, and/or the first notification based on the user response. The update may aid subsequent users performing the same task.

In another embodiment, the first notification and/or the second notification may be associated with user safety notifications. As discussed above, the sensors of the wearable device 100 may take measurements related to user safety, such as temperature measurements, radiation measurements, humidity measurements, and so forth. The processing device may analyze the measurements by the sensors to determine whether the user's safety is in danger and display a notification while the user is performing the task or after the task is complete to provide messages for safety protocols and/or how to adjust the users performance of the task to perform is more safely. For example, when a user is performing a task to repair a part on an oil rig and the user safety information indicates that the ambient temperature exceeds a threshold temperature, the first notification or the second notification may notify the user to stop performing the task until the ambient temperature decrease below the threshold temperature. In another example, the optimizer 314 may send a notification to another device, such as a device associated with a supervisor or a manager, to indicate the user safety dangers for the supervisor or manager to review. The supervisor or manager may adjust tasks to reduce the danger to the user.

In another embodiment, the first notification and/or the second notification may notify the user that the user is performing extra step(s) or activities when performing a task by comparing the activities of the user when performing a task to the activities of other users when performing the task. For example, the processing device may access a database storing information indicating the activities performed by another user while performing a task and may compare those activities with the activities performed by the user (such as those activities measured by sensors). When the user's activities are different than the other users and/or the user's activities include additional activities not performed by the other users, the first notification and/or the second notification may indicate to the user the different and/or additional activities performed by the user.

The method may include sending a third notification to another device indicating an improvement to the task or the task flow for a project (block 614). In one embodiment, the tasks of a task flow and the threshold amounts of time may be generated by a task flow creator. As users are performing the tasks in the task flow for a project, the processing device may send the third notifications to the device associated with the task flow creator. In one embodiment, the notifications may include raw or unfiltered data and the task flow creator may review the data to determine if the task flow creator can adjust the task flow to increase efficiencies, decrease safety issues, and/or decrease issues faced by the users when performing the tasks in the task flow.

In another embodiment, the notification may include messages indicating issues the users faced while performing the task(s) and/or suggestions for how the task flow may be adjusted to increase efficiencies, decrease safety issues, and/or decrease issues faced by the users when performing the tasks in the task flow. For example, the task flow creator may receive notifications indicating an amount of time the users are taking to perform each task and suggestions to adjust the task flow to increase efficiencies, decrease safety issues, and/or decrease issues faced by the users when performing the tasks in the task flow based on the activities of other individuals previously performed the same task.

In one example, the task flow creator may be an automotive service center technician optimizing an augmented reality experience for service task flows. A task flow may range from regular inspection to a complex repair. For each task, data regarding the tasks of the task flow may be collected. The processing device may compare the data with a data model to identify agreements and/or deviations by the user in performing the tasks. When the duration to complete and the amount of time to perform a task exceeds a predefined threshold, the processing device may acquire and/or analyze secondary data indicating the activities performed by the user when performing the tasks, such as the user's hand gesture or head motion to determine the type of task the user is performing, the activities of the user and/or the tools the user is using to perform the task. The processing device may then display the first notification and/or the second notification to provide suggestion to the user on supporting documents, videos, recordings related to the task and/or establish a communication link with an expert to receive aid in performing the task.

The method may include adjusting the at least one of the wearable device 100 in FIGS. 1-5, the task flow, a message associate with the task, the first notification, the second notification, or the third notification based on the collected data (block 616). For example, the processing device may adjust a display of the wearable device 100 in FIGS. 1-5 based on the sensor data and/or the user exceeding the threshold amount of time to perform the tasks. Adjusting the display may include changing configuration of the display, such as a lighting level of the display to improve visibility, altering color schemes of the display to improve contrast, and so forth.

In another embodiment, a task flow owner may manually adjust the setting of the wearable device, the first notification, and/or the second notification based on the sensor data and/or the activities being performed by the user. In another embodiment, the processing device may adjust the settings of the wearable device 100 to determine the settings increase a user's performance when performing tasks. For example, the processing device may perform A/B testing of different settings of the wearable device 100 and analyze the amount of time a user takes to perform the task to determine which setting(s) increases the user's performance when performing the tasks. In another embodiment, the processing device may compare the data from environmental sensors to determine the environmental conditions to increase the user's performance when performing a task.

In another embodiment, the task flow owner or the processing device may adjust the task flow by changing one or more of the tasks of the task flow. For example, the task flow owner may add or remove a task in the map of the task flow. In another embodiment, the task flow owner or the processing device may adjust a message associated with the task. For example, originally the message may instruct the user regarding the next step of the task and the task flow owner or the processing device may adjust or change the message to clarify what the task is and/or what activities the user is to perform to complete the task. In another embodiment, the task flow owner or the processing device may adjust the first notification to aid the user in completing the task on time. For example, the original first notification may have been unclear or imprecise regarding the suggestion or aid for the user to complete the task and task flow owner or the processing device may adjust the first notification to clarify the suggestion or aid. In another example, the task flow owner or the processing device may change the expert or experienced individual with which the user in connected with to aid in completing the task.

In another embodiment, the task flow owner or the processing device may adjust the second notification to aid the user in understanding what caused the user to not complete the task on time. For example, the original second notification may have been unclear or imprecise regarding the suggestion or aid for the user to complete the task next time the user performs the task and the task flow owner or the processing device may adjust the second notification to clarify the suggestion or aid. In another embodiment, the processing device may adjust the third notification to task flow owner in understanding what caused the user to not complete the task on time. For example, when the user does not complete the task within the threshold amount of time for a second time, the processing device may include additional or different sensor information and/or input from the user in the third notification to aid the task flow owner in revising the task flow.

In another embodiment, when the wearable device, the task flow, the message associate with the task, the first notification, the second notification, and/or the third notification have been adjusted the method may end. In another embodiment, when the wearable device, the task flow, the message associate with the task, the first notification, the second notification, and/or the third notification have been adjusted the method may include iteratively selecting other tasks of the task flow to adjust via the same method.

Figure 6B:
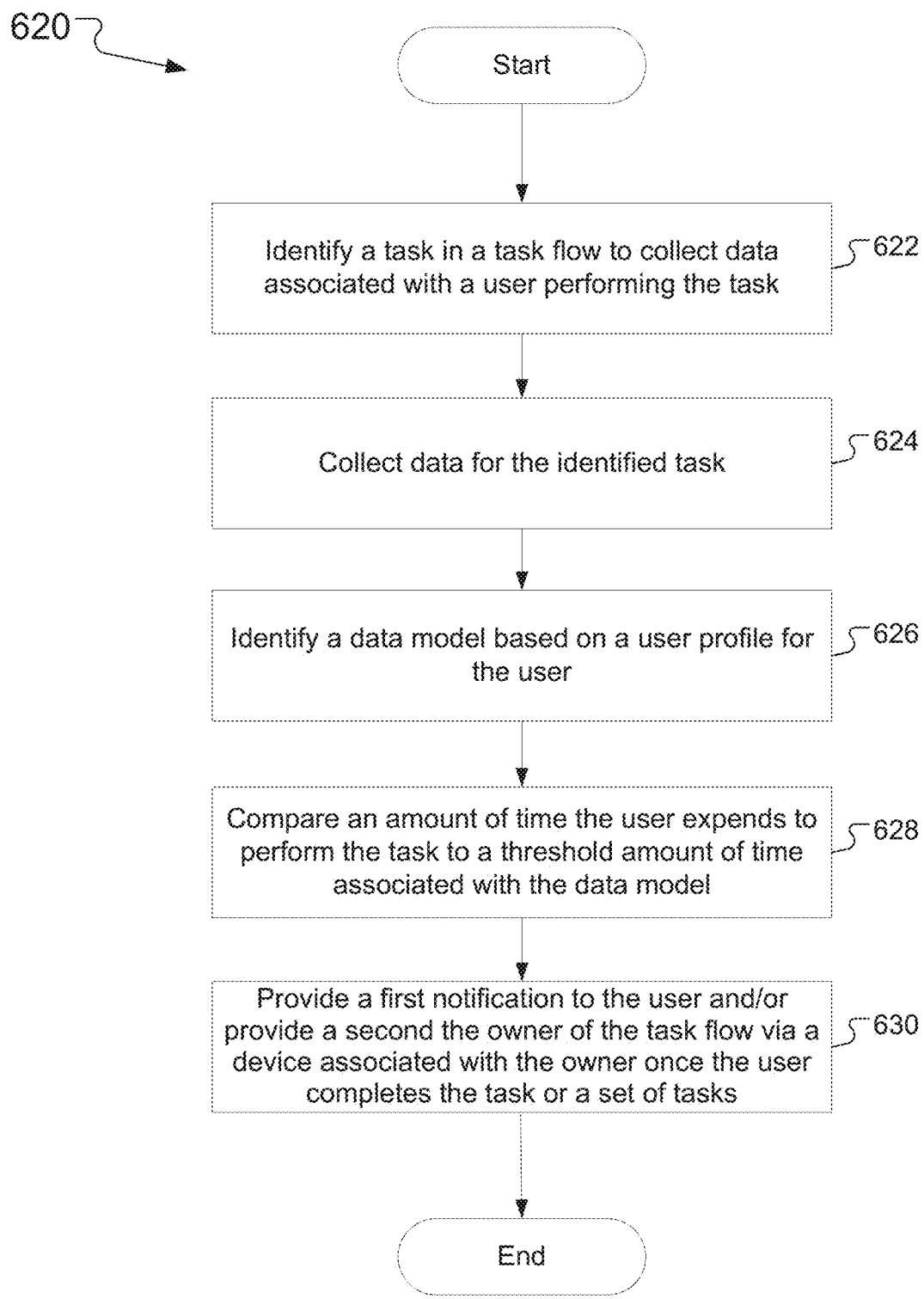
FIG. 6B illustrates a flowchart for a method to adjust task in a task flow, according to an embodiment.

FIG. 6B illustrates a flowchart 620 for a method to adjust task in a task flow, according to an embodiment. In one embodiment, the method in the flowchart 620 may be performed by the optimizer 314 in FIGS. 3 and 4 executing on a processing device. As discussed above, the processing device may collect and analyze sensor data indicating activities performed by a user while performing a task and determine task flow improvements for the activities. These improvements may be shortened task flows or suggesting activities to eliminate. The improvements may be performed while the user is performing the task and/or after the task or project has been completed.

The method may include identifying a task in a task flow to collect data associated with a user performing the task (block 622). In one embodiment, the identified tasks in the task flow may be identified as tasks to optimize or tasks needing review. The identified tasks may be chosen for analysis by the task flow owner, the user, and/or the processing device.

The method may include collecting data for the identified task (block 624). For example, the user may wear the wearable device 100 in FIGS. 1A-5 and when the user starts a task flow for a project, a user interface (UI) may display a first task of the task flow at a display of the wearable device 100. When the display displays the first task, the processing device of the wearable device 100 may initiate a first timer for the task and collect data from one or more sensors of the wearable device 100. When the user completes the task and/or uses the UI to proceed to the next task in the task flow, the processing device may stop the first timer, tag the amount of time from the first timer with the first task, and start a second timer for a second task of the task flow. The processing device may initiate a new timer or reset the current timer to measure the amount of time a user takes to complete a task and associate the amount of time with the task.

The method may include identifying a data model based on a user profile for the user (block 626). In one example, the data and the amount of time taken by the user may be compared to the data and amount of time taken by an expert or an average of task performers. The processing device may determine a difference between the collected data and amount of time and the data model. For example, to determine a difference between the amount of time the user expended to perform a task and the amount of time an expert expended to perform the task, the processing device may subtract the amount of time taken by the user from the amount of time taken by the expert. In another example, to determine a difference between the sensor data of the user and the sensor data of the expert, the processing device may subtract the data of the user from data of the expert. In this example, when the data is movement data, the processing device may determine if the amount of movement by the user was greater than the amount of movement by the expert by subtracting values representative of the amount of movement. The processing device may similarly determine the difference for other types of sensor data such as position data, speed data, angle data, and so forth.

The method may include comparing an amount of time the user expends to perform the task to a threshold amount of time associated with the data model (block 628). If the difference exceeds the threshold, the processing device may display a suggestion for how the user may increase his/her performance when performing the task of the task flow. If the difference is below the threshold, the processing device may display no suggestion or may display a message encouraging or congratulating the user. As discussed above, the thresholds may be based on the experience level of the user, the industry associated with the task flow, and so forth. Also as discussed above, the sensors may collect environmental data, such as light parameters such as hue, intensity, and illumination level for an environment approximate the user. The processing device may generate or adjust the threshold for the amount of time or the data in view of the environmental data. In another embodiment, the processing device may display via the display recommended environmental characteristics for the user to perform the task, such as the lighting levels, noise levels, weather conditions, and so forth.

The method may include providing a first notification to the user (such as via the display) and/or providing a second notification to the owner of the task flow via a device associated with the owner once the user completes the task or a set of tasks (block 630). For example, the processing device may send a device associated with the owner a message to display to the owner alerting the owner regarding an amount of time or other data for a single user or a set of user performing one or more tasks of the task flow. In another example, the processing device may display the first notification to the user via the display in FIGS. 1A-5 to indicate that the user is performing extra activities or steps when compared to their peers or the next level of skill user. The first notification may also include suggestions to the user to communicate with the owner or an expert for the task or the project.

The first notification may also include suggestions to the user on how peers performed or resolved the task. For example, a database may store the data for the user and/or other users performing the task and the processing device may query to the database to identifying users with the same or similar sensor data and/or time data as the user, indicating the identified users may have encountered the same or similar difficulties for the task as the current user. The processing device may then retrieve information in the database associated with the identified users, where the information may indicate how the identified users resolved the issues or problems they encountered while performing the task or project. The processing device may then display the information to the current user and/or suggestions based on the information.

In one example, the user may be an automotive service center technician using the wearable device 100 while serving vehicles. The projects for the task flows may range from regular vehicle inspection to complex automotive repairs. For each project, data associated with the user may be collected by the sensors and processing device of the wearable device 100. The data may include time duration data, location data, temperature data, pressure sensor data, and so forth. The processing device may compare the data to a data model or model profile. As discussed above, when the data exceeds a threshold level, the processing device may acquire secondary data, for the same sensors and/or other sensors. For example, the secondary data may indicate the tools used by a user to perform the task, head motion data indicating a type of task the user is performing, and so forth. The processor suggests to the user supporting documents, videos, recordings related to the task. After a second duration is exceeded, the processor offers to contact the experts related to the task and arranges a conference call.

In another embodiment, the processing device may send a message to the device associated with the owner when the project is completed indicating improvements for the user to more efficiently perform the task(s) of the task flow. In one example, the message may indicate that multiple users are encountering the same issue when performing a task or set of tasks and the users are taking more time to complete the task or set of tasks than the threshold amount of time. The multiple users encountering the same issue may indicate the task may need to be split up into multiple tasks, the task flow is missing a task, and/or that additional time may be needed to complete the task or set of tasks.

In another embodiment, the processing device may continuously monitor the user while the user is performing a task or set of tasks for a project. As discussed above, the data collected may relate to user safety data, such as temperature data, radiation data, humidity data, safety data, and so forth. The processing device may analyze the user safety data to determine when the user may be in danger (such as when the ambient temperature or noise level is too high) and the processor device may display via the display a safety task flow to aid the user to resolve or avoid the dangerous situation.

Figure 7:
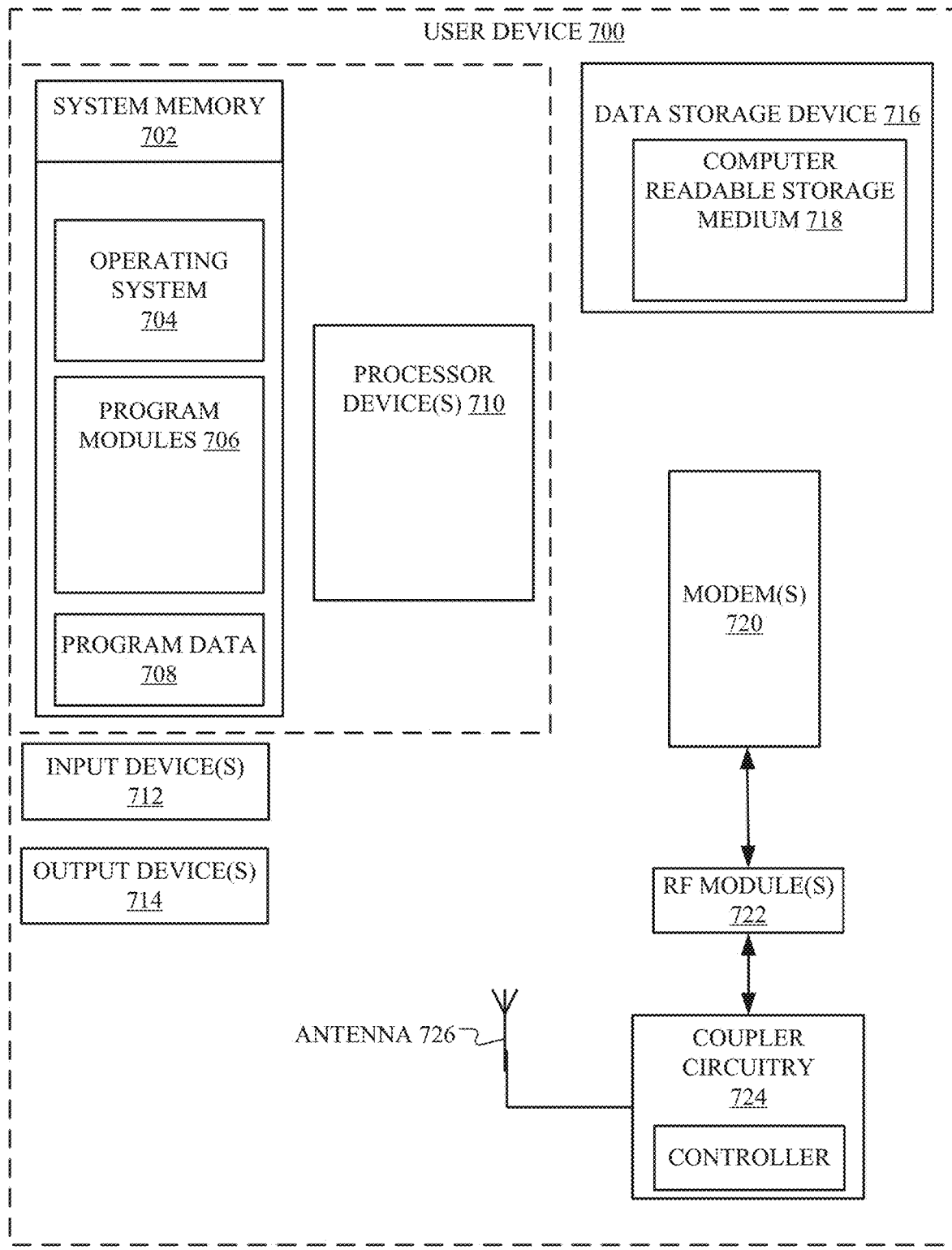
FIG. 7 is a block diagram of a user device with a processing device in which implementations of methods, systems, devices, or apparatuses in FIGS. 1-6B may be implemented.

FIG. 7 is a block diagram of a user device 700 with a processing device in which implementations of methods, systems, devices, or apparatuses in FIGS. 1-6B may be implemented. The user device 700 may display and/or implement the method and GUIs of FIGS. 1A-6B. The user device 700 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 700 may be any portable or stationary user device. For example, the user device 700 may be an intelligent voice control and speaker system. Alternatively, the user device 700 can be any other device used in a WLAN network (e.g., Wi-Fi® network), a WAN network, or the like.

The user device 700 includes one or more processing device(s) 710, such as one or more CPUs, microcontrollers, field programmable gate arrays, or other types of processing devices. The user device 700 also includes system memory 702, which may correspond to any combination of volatile and/or non-volatile storage mechanisms. The system memory 702 stores information that provides operating system 704, various program modules 706, program data 708, and/or other components. In one implementation, the system memory 702 stores instructions of the methods in FIGS. 6A and 6B as described herein. The user device 700 performs functions by using the processing device(s) 710 to execute instructions provided by the system memory 702.

The user device 700 also includes a data storage device 716 that may be composed of one or more types of removable storage and/or one or more types of non-removable storage. The data storage device 716 includes a computer-readable storage medium 718 on which is stored one or more sets of instructions embodying any of the methodologies or functions described herein. Instructions for the program modules 706 may reside, completely or at least partially, within the computer-readable storage medium 718, system memory 702 and/or within the processing device(s) 710 during execution thereof by the user device 700, the system memory 702 and the processing device(s) 710 also constituting computer-readable media. The user device 700 may also include one or more input devices 712 (keyboard, mouse device, specialized selection keys, etc.) and one or more output devices 714 (displays, printers, audio output mechanisms, etc.).

The user device 700 further includes modem 720 to allow the user device 700 to communicate via a wireless network (s) (e.g., such as provided by the wireless communication system) with other computing devices, such as remote computers, an item providing system, and so forth. The modem 720 can be connected to zero or more RF modules 722. The zero or more RF modules 722 can be connected to zero or more coupler circuitry 724. The RF modules 722 and/or the coupler circuitry 724 may be a WLAN module, a WAN module, PAN module, or the like. Antenna 726 is coupled to the coupler circuitry 724, which is coupled to the modem 720 via the RF modules 722. The modem 720 allows the user device 700 to handle both voice and non-voice communications (such as communications for text messages, multimedia messages, media downloads, web browsing, etc.) with a wireless communication system. The modem 720 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi® technology, Long Term Evolution (LTE) and LTE Advanced (sometimes generally referred to as 4G), etc.

The modem 720 may generate signals and send these signals to antenna 726 via coupler circuitry 724 as described herein. User device 700 may additionally include a WLAN module, a GPS receiver, a PAN transceiver and/or other RF modules. The coupler circuitry 724 may additionally or alternatively be connected to one or more of coupler arrays. The antenna 726 may be configured to transmit in different frequency bands and/or using different wireless communication protocols. The antenna 726 may be directional, omnidirectional, or non-directional antennas. In addition to sending data, the antenna 726 may also receive data, which is sent to appropriate RF modules 722 connected to the antenna 726.

In one implementation, the user device 700 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one implementation, the first wireless connection is associated with a first resonant mode of an antenna structure that operates at a first frequency band and the second wireless connection is associated with a second resonant mode of the antenna structure that operates at a second frequency band. In another implementation, the first wireless connection is associated with a first antenna element and the second wireless connection is associated with a second antenna element. In other implementations, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though modem 720 is shown to control transmission and reception via the antenna 726, the user device 700 may alternatively include multiple modems, each of which is configured to transmit/receive data via a different antenna and/or wireless transmission protocol.

The user device 700 delivers and/or receives items, upgrades, and/or other information via the network. For example, the user device 700 may download or receive items from an item providing system. The item providing system receives various requests, instructions and other data from the user device 700 via the network. The item providing system may include one or more machines (e.g., one or more server computer systems, routers, gateways, etc.) that have processing and storage capabilities to provide the above functionality. Communication between the item providing system and the user device 700 may be enabled via any communication infrastructure. One example of such an infrastructure includes a combination of a wide area network (WAN) and wireless infrastructure, which allows a user to use the user device 700 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected to the network. The WLAN hotspots can be created by products based on IEEE 802.11x standards for the Wi-Fi® technology by Wi-Fi® Alliance. Another of the wireless communication systems may be a wireless carrier system that can be implemented using various data processing equipment, communication towers, etc. Alternatively, or in addition, the wireless carrier system may rely on satellite technology to exchange information with the user device 700.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user device 700 is variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 700 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that implementations may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present implementations are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other implementations will be apparent to those of skill in the art upon reading and understanding the above description. The scope of the present implementations should, therefore, be determined with reference to the appended claims, along with the full scope of equivalents to which such claims are entitled.

In the above description, numerous details are set forth. It will be apparent, however, to one of ordinary skill in the art having the benefit of this disclosure, that implementations may be practiced without these specific details. In some instances, well-known structures and devices are shown in block diagram form, rather than in detail, in order to avoid obscuring the description.

Although the implementations may be herein described with reference to specific integrated circuits, such as in computing platforms or microprocessing devices, other implementations are applicable to other types of integrated circuits and logic devices. Similar techniques and teachings of implementations described herein may be applied to other types of circuits or semiconductor devices. For example, the disclosed implementations are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below.

Although the implementations are herein described with reference to a processing device or processing device, other implementations are applicable to other types of integrated circuits and logic devices. Similar techniques and teachings of implementations of the present invention may be applied to other types of circuits or semiconductor devices that may benefit from higher pipeline throughput and improved performance. The teachings of implementations of the present invention are applicable to any processing device or machine that performs data manipulations. However, the present invention is not limited to processing devices or machines that perform 512 bit, 256 bit, 128 bit, 64 bit, 32 bit, and/or 16 bit data operations and may be applied to any processing device and machine in which manipulation or management of data is performed. In addition, the following description provides examples, and the accompanying drawings show various examples for the purposes of illustration. However, these examples should not be construed in a limiting sense as they are merely intended to provide examples of implementations of the present invention rather than to provide an exhaustive list of all possible implementations of implementations of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or media devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

Implementations described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present implementations. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present implementations.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description below. In addition, the present implementations are not described with reference to any particular programming language. It will be appreciated that a variety of programming languages may be used to implement the teachings of the implementations as described herein.

The above description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

It is to be understood that the above description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. A device, comprising:
   a head-mounted display configured to display a virtual object in an augmented reality environment;
   a sensor configured to monitor a user performing a task;
   a processing device coupled to the head-mounted display and the sensor, wherein the processing device is configured to:
      identify the task in a task flow for a project to collect data associated with the user performing the task;
      display a message associated with the task;
      collect data for the task using the sensor;
      identify a data model based on a user profile for the user;
      compare an amount of time the user expends to perform the task to a threshold amount of time associated with the data model; and
      in response to the amount of time the user expends to perform the task exceeding the threshold amount of time:
         provide a first notification to the user while performing the task;
         provide a second notification to the user when the task or the project is completed;
         send a third notification to another device indicating an improvement to the task or the task flow for the project, wherein:
            the third notification comprises at least one of a data set, a text object, a graphical object, a video, a video chat, or a live data stream; and
            the third notification indicating an improvement comprises at least one of raw data, unfiltered data, a first message indicating an issue the user faced while performing the task, a second message indicating a suggestion for how the user may adjust the task flow; and
         adjust at least one of the device, the task flow, the message associate with the task, the first notification, the second notification, or the third notification based on the collected data.

2. The device of claim 1, wherein the first notification includes a suggestion to aid the user in performing the task.

3. The device of claim 1, wherein the first notification includes communication link to another device associated with an expert or an individual with experience performing the task.

4. The device of claim 1, wherein the first notification includes a request for the user to provide feedback via an input device indicating whether the first notification was helpful to the user in completing the task.

5. The device of claim 1, wherein the second notification includes a communication link to another device associated with an expert or an individual with experience performing the task.

6. The device of claim 1, wherein the second notification includes a message indicating the user performed an extra step or an extra activity when performing the task.

7. The device of claim 1, wherein the first notification or the second notification include a safety notification.

8. The device of claim 1, wherein the third notification includes the data set, the text object, the graphical object, the video, the video chat, or the live data stream based on the collected data.

9. The device of claim 1, wherein the processing device is configured to, in response to the amount of time the user expends to perform the task not exceeding the threshold amount of time, select another task of the task flow to compare to another threshold amount of time and provide an associated notification for.

10. The device of claim 1, wherein to adjust the device the processing device is configured to adjust a configuration of the head-mounted display based on the collected data.

11. The device of claim 10, wherein to adjust the configuration of the head-mounted display the processing device is configure to adjust a lighting configuration of the head-mounted display.

12. The device of claim 1, wherein the processing device is configured to adjust the task flow based on the collected data.

13. The device of claim 1, wherein the processing device is configured to adjust the message associated with the task, the first notification, the second notification, or the third notification based on the collected data.

14. A device, comprising:
   a display configured to display a virtual object in an augmented reality environment or a virtual reality environment;
   a sensor configured to monitor a user performing a task; and
   a processing device coupled to the display and the sensor, wherein the processing device is configured to:
      identify the task in a task flow for a project to collect data associated with the user performing the task;
      collect data for the task using the sensor;
      compare an amount of time the user expends to perform the task to a threshold amount of time associated with a user profile for the user; and
      in response to the amount of time the user expends to perform the task exceeding the threshold amount of time:
         display a first notification to the user while performing the task; or
         display a second notification to the user when the task or the project is completed; and,
         send a third notification to another device indicating an improvement to the task or the task flow, wherein:
            the third notification comprises at least one of a first data set, a first text object, a first graphical object, a first video, a first video chat, or a first live data stream; and
            the third notification indicating an improvement comprises at least one of raw data, unfiltered data, a first message indicating an issue the user faced while performing the task, or a second message indicating a suggestion for how the user may adjust the task flow.

15. The device of claim 14, wherein the first message or the second message indicates at least one of: how the user may adjust the task flow to increase an efficiency of the task flow; how the user may adjust the task flow to decrease safety issues; how the user may adjust the task flow to decrease issues faced by the users when performing the task; or an amount of time the user took to perform the task.

16. The device of claim 15, wherein the processing device is further configured to, in response to the amount of time the user expends to perform the task exceeding the threshold amount of time, change, based on the collected data, at least one of:
  an instruction provided to the user as part of the task flow;
  a second data set, a second text object, a second graphical object, a second video, a second video chat, or a second live data stream of the first notification; or
  a third data set, a third text object, a third graphical object, a third video, a third video chat, or a third live data stream of the second.

17. A method, comprising:
  identifying, by a processing device, a first task in a task flow to collect data associated with a user performing the first task;
  collecting, by a sensor, a first set of data associated with the user performing the first task;
  comparing, by the processing device, an amount of time the user expends to perform the first task to a first threshold amount of time; and
  in response to the amount of time the user expends to perform the first task exceeding the first threshold amount of time:
    displaying, by the display, a first notification to the user while performing the first task;
    displaying, by the display, a second notification to the user when the first task or the project is completed;
    sending, by the processing device, a third notification to another device indicating an improvement to the first task or the task flow for a project; or
    changing, based on the collected data, at least one of:
      an instruction provided to the user as part of the task flow;
      a first data set, a first text object, a first graphical object, a first video, a first video chat, or a first live data stream of the first notification; or
      a second data set, a second text object, a second graphical object, a second video, a second video chat, or a second live data stream of the second notification; or
      a third data set, a third text object, a third graphical object, a third video, a third video chat, or a third live data stream of the third notification.

18. The method of claim 17, wherein the first threshold amount of time corresponds to a user profile associated with the user.

19. The method of claim 18, wherein the first threshold amount of time is based on an experience feature of the user, an industry associated with the first task, or an environmental condition in an area where the first task is performed by the user.

20. The method of claim 17, further comprising:
  identifying, by the processing device, a second task in the task flow to collect data associated with the user performing the second task;
  collecting, by the sensor, a second set of data associated with the user performing the second task;
  comparing, by the processing device, an amount of time the user expends to perform the second task to a second threshold amount of time; and
  in response to the amount of time the user expends to perform the second task exceeding the second threshold amount of time:
    displaying, by the display, a fourth notification to the user while performing the second task;
    displaying, by the display, a fifth notification to the user when the second task or the project is completed;
    sending, by the processing device, a sixth notification to the other device indicating an improvement to the second task or the task flow for the project; or
    adjusting, by the processing device, at least one of the task flow, the fourth notification, the fifth notification, or the sixth notification based on the second set of data.

* * * * *